(12) United States Patent
Korde et al.

(10) Patent No.: US 7,725,283 B2
(45) Date of Patent: May 25, 2010

(54) METHODS AND APPARATUS FOR A VIRTUAL TEST CELL

(75) Inventors: Uday P. Korde, Ann Arbor, MI (US); Pochuan B. Hsing, Sterling Heights, MI (US); Xu Han, Novi, MI (US); Xinyu Zhou, Troy, MI (US); Rohit S. Paranjpe, Rochester Hills, MI (US); Joseph P. Kelly, Pinckney, MI (US); Julian J. Blair, Northville, MI (US); Donald R. Jones, Troy, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 57 days.

(21) Appl. No.: 12/111,461

(22) Filed: Apr. 29, 2008

(65) Prior Publication Data

US 2009/0271138 A1 Oct. 29, 2009

(51) Int. Cl.
*G06F 19/00* (2006.01)
(52) U.S. Cl. .................................. 702/117; 702/85
(58) Field of Classification Search .............. 702/85, 702/113, 117; 324/665
See application file for complete search history.

(56) References Cited

U.S. PATENT DOCUMENTS

| 6,754,603 | B2* | 6/2004 | Turbett et al. ............... 702/113 |
| 2006/0261822 | A1* | 11/2006 | Fraser ........................ 324/665 |

* cited by examiner

*Primary Examiner*—Bryan Bui
(74) *Attorney, Agent, or Firm*—Ingrassia Fisher & Lorenz, P.C.

(57) ABSTRACT

A method for calibrating a physical test cell includes the steps of: determining a set of inputs to be provided to the physical test cell based in part on a set of historical test data; providing the inputs to the physical test cell and receiving a set of outputs associated therewith, wherein the providing includes implementing a sequential space filling sampling procedure to substantially cover a region defined by the set of historical values; creating a virtual test cell comprising one or more response surfaces based on the set of outputs; and interrogating the virtual test cell to determine a calibration relationship between at least one of the inputs and at least one of the outputs. Smooth Kriging may be used to determine the virtual test cell.

20 Claims, 5 Drawing Sheets

METHODS AND APPARATUS FOR A VIRTUAL TEST CELL

TECHNICAL FIELD

The present invention generally relates to automated testing systems, and more particularly relates to testing systems incorporating a virtual test cell methodology for calibration of electromechanical components such as automotive powertrains and the like.

BACKGROUND

Automated testing procedures—particularly those used to characterize complicated electromechanical systems—are often costly and time-consuming. As technology levels increase, the number of variables and complexity associated with such components likewise dramatically increases.

In the case of powertrains and other automotive components, for example, there exist so many inputs and outputs associated with the system that the number of measurements required to properly calibrate even one aspect may take weeks to complete. A modern diesel engine, for example, may have as many as thirteen variables requiring calibration. Systematic and exhaustive measurements of such a system would be prohibitively time-consuming and expensive.

Prior art methods typically address this problem by performing individual tests for each calibration of interest. Design of Experiments (DOE) techniques are used to achieve test efficiency by limiting test conditions to a small set, with the assumption that certain inputs to not interact in their effect on the outputs, and/or that the test outputs follow a presumed mathematical relationship. These prior art testing methodologies may not properly take into account interaction between multiple variables, and therefore do not produce models amenable to optimization—e.g., optimization with respect to fuel economy, performance, quality, etc.

Accordingly, there is a need for improved methods and systems for calibration and testing of complicated electromechanical systems.

BRIEF SUMMARY

In general, the present invention provides methods and apparatus for automated testing of a physical test cell using a virtual test cell methodology. In general, and as described in further detail below, a limited set of test data is sequentially and strategically collected from the test cell, and a mathematical model is created based on the measured responses. The resulting model or set of models composes a virtual test cell which itself can be measured at points that were not included in the limited set of original test data. In this way, the time and expense associated with component calibration can be significantly reduced.

In accordance with one embodiment, a method for calibrating a physical test cell, includes the steps of: determining a set of inputs to be provided to the physical test cell based in part on a set of historical test data; providing the inputs to the physical test cell and receiving a set of outputs associated therewith, wherein the providing includes implementing a sequential space filling sampling procedure to substantially cover a region defined by the set of historical values; creating a virtual test cell comprising one or more response surfaces based on the set of outputs; and interrogating the virtual test cell to determine a calibration relationship between at least one of the inputs and at least one of the outputs.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention is directed to automated testing of components (or "physical test cell") using a virtual test cell methodology wherein a limited set of test data is collected from the physical test cell using a space-filling procedure, and a mathematical model is created based on the measured responses. The resulting model or set of models composes a virtual test cell which itself can be measured at points that were not included in the limited set of original test data.

As a preliminary matter, the following detailed description is merely illustrative in nature and is not intended to limit the embodiments of the invention or the application and uses of such embodiments. Thus, while the present invention may be described in conjunction with engine powertrains and other automotive components, the present invention is not so limited, and may be employed to measure and calibrate any suitable electromechanical system.

Furthermore, embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more computers, microcontrollers, or other control devices.

For the sake of brevity, conventional techniques related to data processing, curve fitting, automotive components, and other well-known functional aspects of such systems may not be described in detail herein. Furthermore, the connecting lines shown in the various figures contained herein are intended to represent example functional relationships and/or physical couplings between the various elements.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

Figure 1:
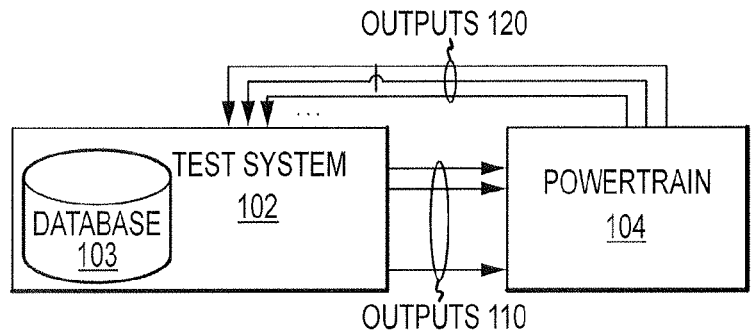
FIG. 1 is a general block diagram showing an overview of an exemplary test system.

Referring to FIG. 1, a simplified, conceptual test environment useful in describing one embodiment of the present invention generally includes two parts: a test system 102 and a physical test cell (e.g., a powertrain) 104 communicatively coupled to test system 102. The term "powertrain" is used as an example physical test cell herein without loss of generality. Test system 102, which will typically include one or more databases 103, provides one or more inputs 110 to powertrain 104 in any suitable fashion, and simultaneously measures one or more outputs 120. Suitable sensors (not shown) and actuators are typically used to measure outputs 120 and provide inputs 110 to powertrain 104.

Figure 2:
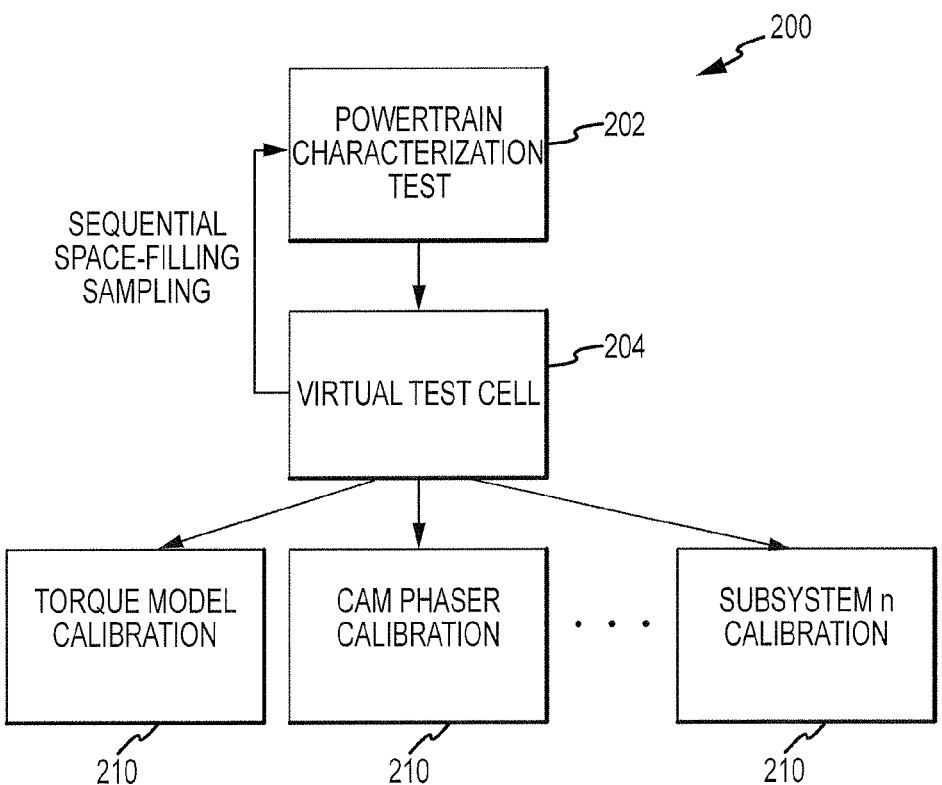
FIG. 2 is a flowchart showing a virtual test cell test method in accordance with one embodiment.

FIG. 2 provides a general method 200 in accordance with the present invention. First, in step 202, a powertrain characterization test 202 is performed. This involves, initially, determining all measurements that can be made from the physical test cell calibration of powertrain 104. Only the variable ranges for step 202 need to be specified (e.g., 600 rpm-6000 rpm). In contrast, traditional testing requires discrete variable levels to be specified (e.g., 600, 1000, 2000, 3000 rpm etc.) need not be specified. Accuracy required from the calibration drives the quantity of physical test rather than following a fixed test plan in the traditional process.

A virtual test cell 204 is then created, preferably using a sequential space-filling sampling method. That is, the system calibrates the virtual test cell to produce desired level of accuracy of output using: (a) efficient test plans with space-filling sampling, (b) historical boundaries for similar powertrains to create safe and stable test regions, (c) conditions for each test point chosen in a space filling sequence that systematically samples the entire operating region, (d) physical test measurements conducted at predetermined monitoring points chosen for gauging prediction errors of the response surface model associated with the virtual test cell, (e) response surface models (for each output) employing Kriging interpolation, and (f) convergence checks on each model.

Finally, various calibrations 210 are created using the virtual test cell (204). This involves "running" the virtual test cell for all desired test points, including points where no measurements were made in conjunction with step 202. The virtual test cell can then be "run" as many times as required to produce data at all the points required including points at which no measurements were made. This step may employ mathematical optimization on the outputs of the virtual test cell using objective functions and constraints. In the illustrated embodiment in the context of a powertrain, calibration steps 210 include a torque model calibration, and a cam phaser calibration. Any number of such calibration steps may be performed in this manner.

Finally mathematical optimization is used to produce calibrations that optimize fuel economy, performance, quality, regulatory metrics etc. As mentioned above, when there are many variables that can be changed simultaneously, as is increasingly the case with advanced powertrain technologies, manual calibrations are far from optimal.

The described method using the "sequential space filling" test sampling plans is substantially more efficient and has been found to require approximately 15%-80% less data than traditional test plans. Many separate tests that were needed in the traditional process can be eliminated.

Figure 3:
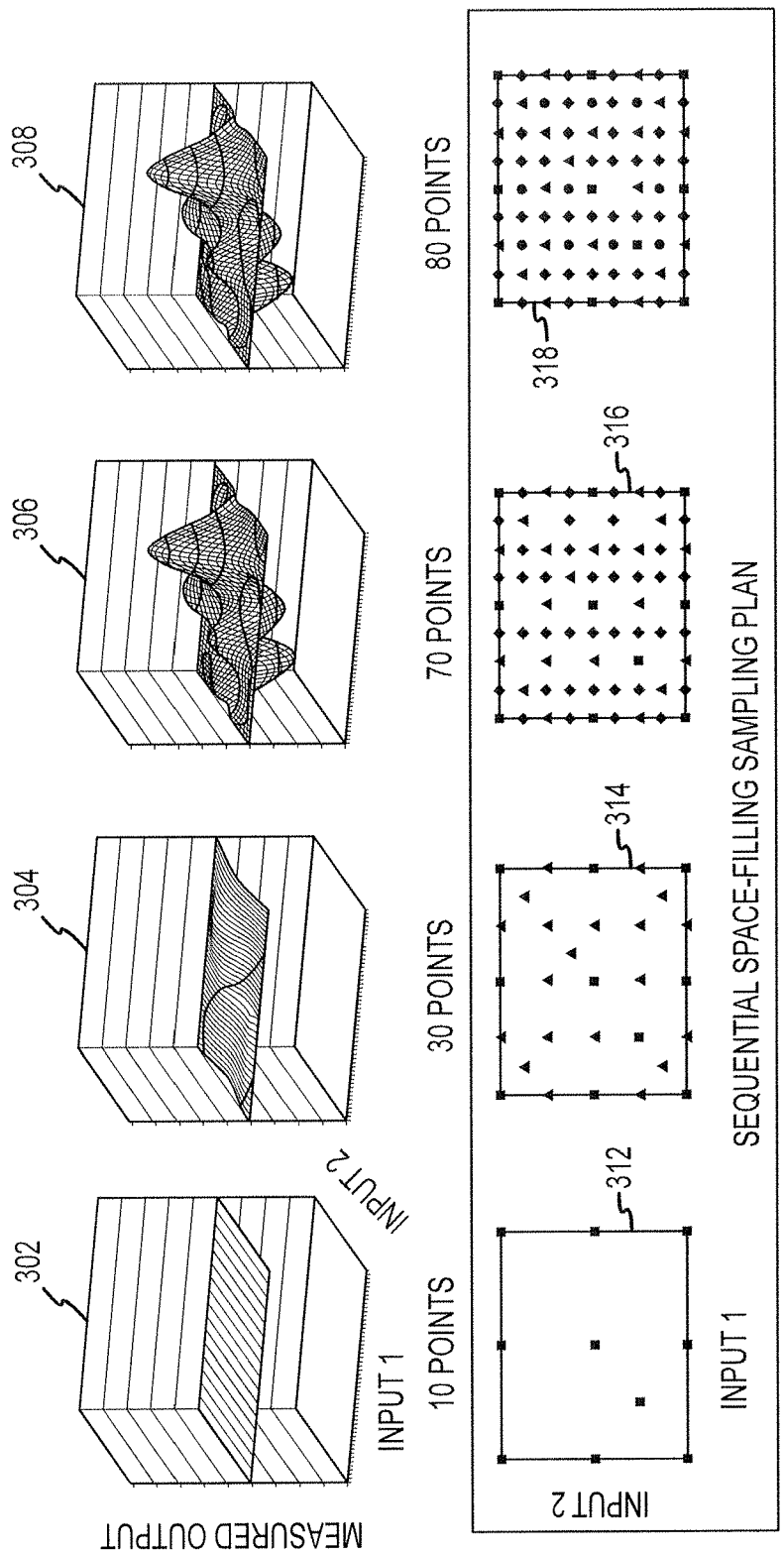
FIG. 3 illustrates example conceptual plots relating to an exemplary sequential space-filling sampling plan.

FIG. 3 depicts a sequential response surfaces corresponding to a sequential space-filling method in accordance with a simplified embodiment. As mentioned above, a space filling sequence systematically samples all or nearly all of the operating region. That is, the measured output is a response surface that progressively changes (in plots 302, 304, 306, and 308) as the number of test points increases. In this illustration, in the interest of clarity, there are only two inputs ("input 1" and "input 2"). Those skilled in the art will recognize that a typical system may include many more such inputs.

In the first plot, 302, a set of 10 points 312 are illustrated, with eight corresponding to the boundary. As space filling increases, twenty more points are selected based on the previous data points, resulting in a set 314 of 30 data points. Next, as the number of points increases to 70 points, the response surface plot 306 takes on a more detailed form. Additional points, as shown in plot 308 corresponding to set of points 318, are used to monitor how much the response surface changes as new sampled points are added in the space-filling sequence. Physical measurements are not taken at these points; instead, the system only makes predictions of the outputs at the monitoring points and then tracks the extent to which these predictions change as new sampled points are added. When the predictions change very little, it is determined that the response surface has "converged," providing the system with a suitable model. As mentioned previously, the monitoring points themselves are not used as data to model the response surface, but are used only to check for convergence.

Figure 5:
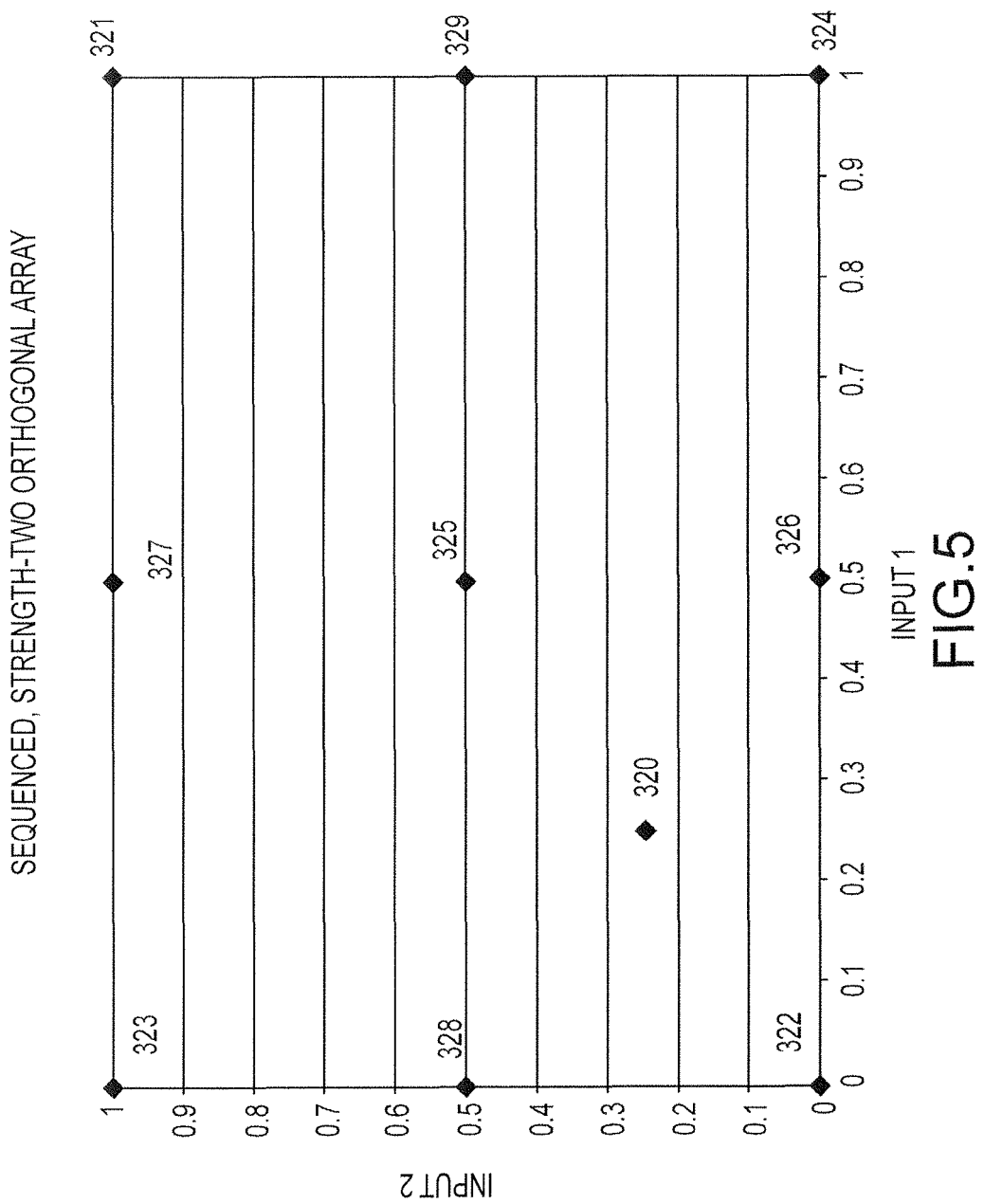
FIG. 5 illustrates an exemplary space-filling in accordance with one embodiment.
Figure 6:
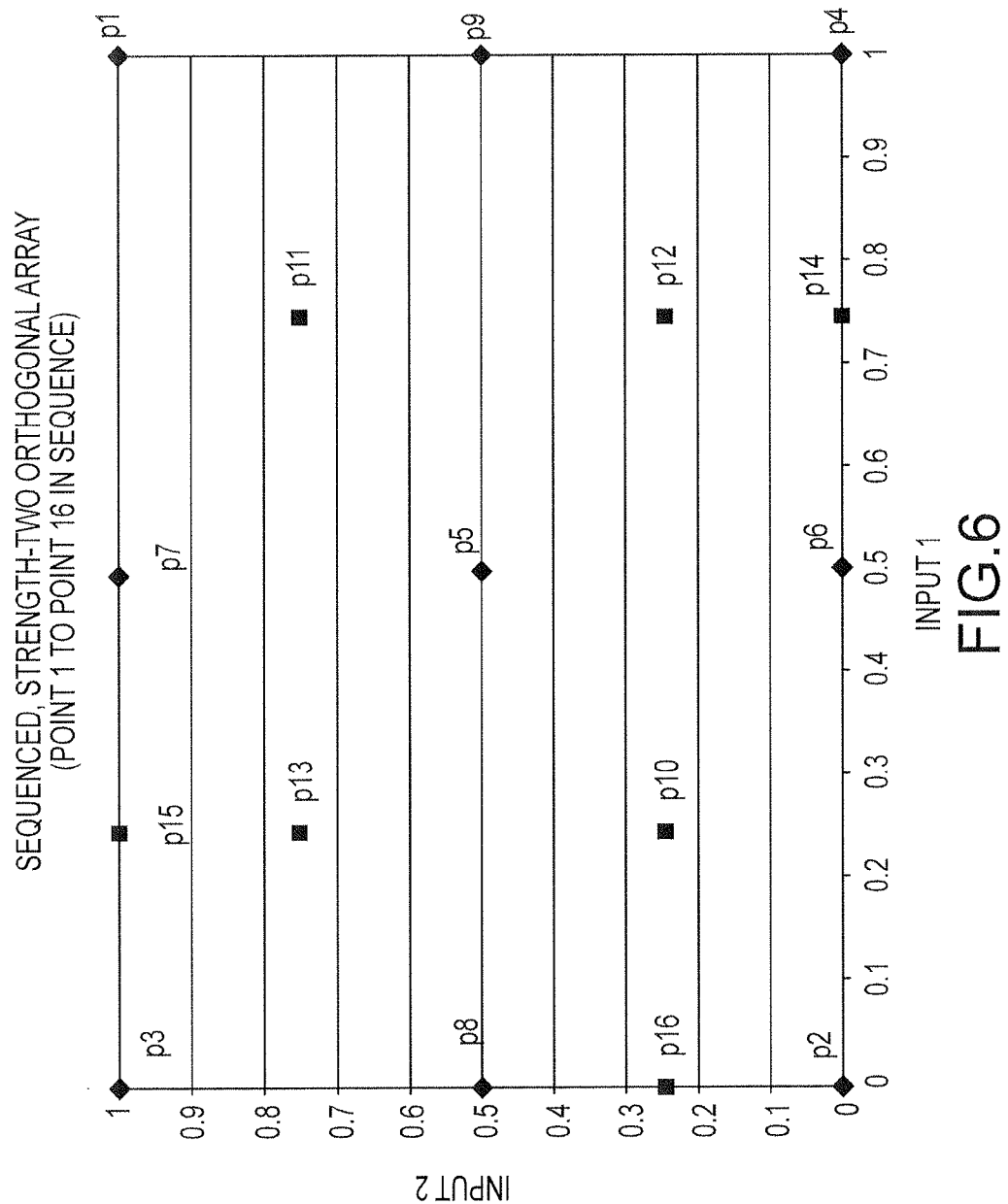
FIG. 6 further illustrates exemplary space-filling procedure.

FIGS. 5 and 6 show a more detailed space-filling process, expanding on what was illustrated in FIG. 3. That is, FIG. 5 shows the first ten points (320-329) distributed within a sequenced, strength-two orthogonal array. Similarly, FIG. 6 shows the order in which the points are added (p1, p2, p3, . . . , p16) for the first sixteen points. Points are added one-by-one, but the monitoring points are not physically tested. Rather, the monitoring points are used as input locations to predict the output of the Kriging response surface model. They are usually located in finer grid points of the original input domain. Convergence checks are done by calculating the root mean square (RMS) of prediction errors from two consecutive Kriging response models. The difference between RMS values determines whether convergence has occurred. Thus, if the RMS difference between two consecutive surfaces gets within a pre-specified tolerance, then no further physical testing is needed.

The method by which space filling is achieved may be selected in accordance with the desired efficiency and accuracy. In one embodiment, for example, the system maximizes the minimum distance between the new point and the surrounding points (using a penalty measure).

Figure 4:
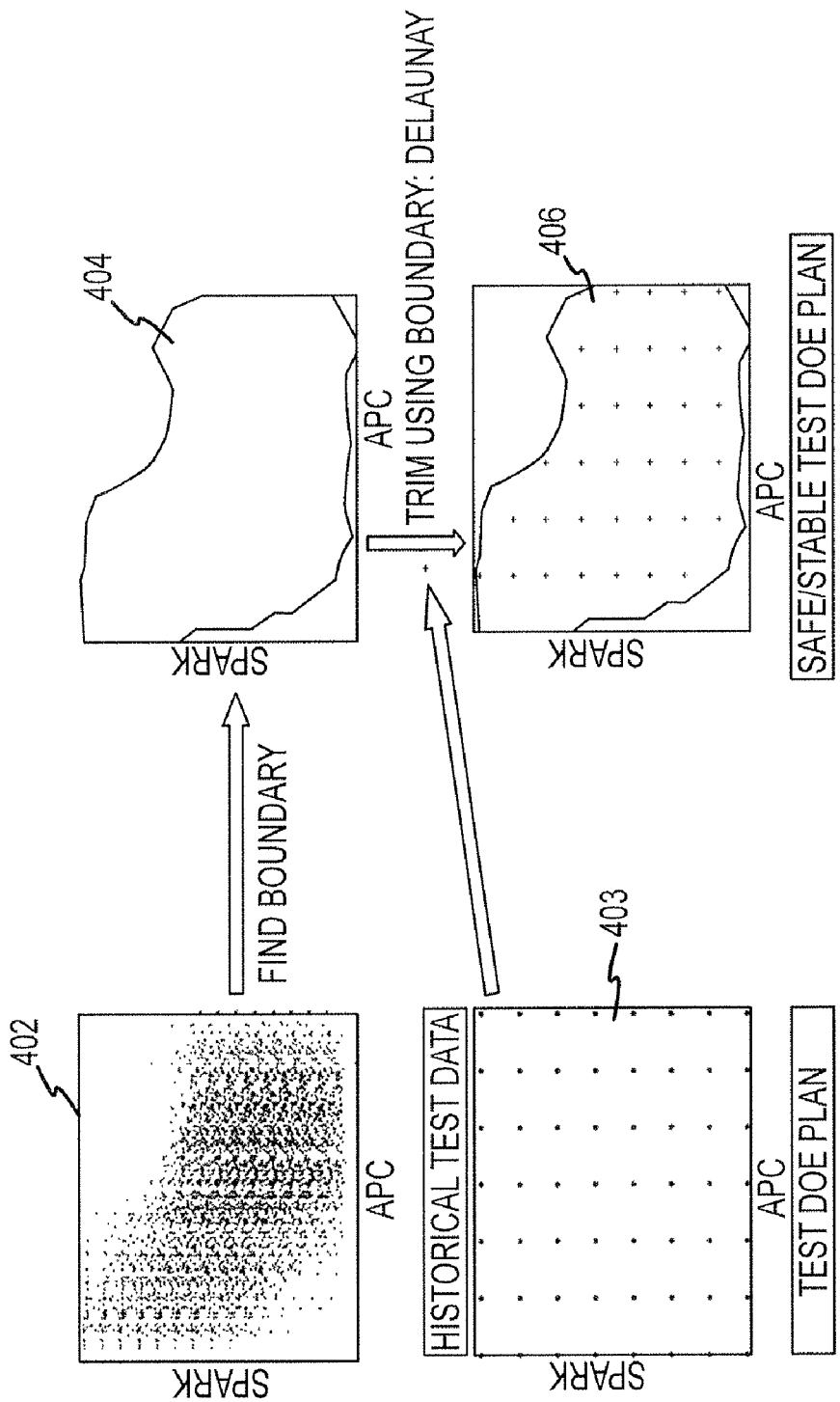
FIG. 4 illustrates an exemplary test plan region in accordance with one embodiment.

FIG. 4 shows the use of historical boundaries for the same or similar powertrains to determine a safe and stable testing region. More particularly, a set of historical test data set 402 is provided. The boundary 404 of this data is then determined. This boundary may be a convex hull shape, but in any event is preferably a closed polygon that substantially surrounds the majority of data points in data set 402. A set of data points 403 associated with a design of experiments (DOE) test plan is also provided. This test plan may include a regular array (in n-dimensional space) of data points, as shown, or may have any other suitable configuration. The boundary 404 is then superimposed on the DOE test plan 403 to provide an intersection of the two sets, resulting in the desired stable test plan 406.

Table 1 below shows exemplary benefits of this method for test point reduction, which goes up dramatically as the number of variables increase. For example, a Diesel engine may have as many as thirteen variables for calibration, while a modern gasoline engine may have three such variables.

TABLE 1

Example test-point reduction

| Number of Variables | Examples | % Reduction in Number of Test Points compared to traditional test |
|---|---|---|
| 2 | No Cam Phasers (eg. Load, Speed) | 15-20% |
| 3 | Dual Equal Cam Phaser Engine | 50% |

TABLE 1-continued

Example test-point reduction

| Number of Variables | Examples | % Reduction in Number of Test Points compared to traditional test |
|---|---|---|
| 4 | Dual Independent Cam Phaser Engine | 80% |
| 5 or more | SIDI, Diesel | >95% |

The methods described herein may be applied regardless of whether evaluations are done through test or through Computer Aided Engineering (CAE).

In one example, the described method was used in connection with torque model calibration of a powertrain. Using traditional methods this torque model testing would typically take approximately forty days to complete using a set of dynamometers. By using the virtual test cell methodology disclosed herein, however, the number of data points needed was reduced from 2688 to 600 and the overall duration of the procedure was reduced from forty days to nine days with a significant cost savings. In addition, the virtual test cell constructed from the torque model test allows several other time-consuming independent physical tests for cam phaser calibration, volumetric efficiency calibration, and the like to be eliminated.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. A method for calibrating a physical test cell, the method comprising:
    determining a set of inputs to be provided to the physical test cell based in part on a set of historical test data;
    providing the inputs to the physical test cell and receiving a set of outputs associated therewith, wherein the providing includes implementing a sequential space filling sampling procedure to substantially cover a region defined by the set of historical values;
    creating a virtual test cell comprising one or more response surfaces based on the set of outputs, wherein creating the virtual test cell includes storing instructions within a computer-readable medium, the instructions being configured to cause a processor to produce a virtual test cell output based on a virtual test cell input and the one or more response surfaces; and
    interrogating the virtual test cell to determine a calibration relationship between at least one of the inputs and at least one of the outputs, wherein the interrogating includes providing a set of test points to the virtual test cell and receiving a set of virtual test cell outputs corresponding to the set of test points on the one or more response surfaces.

2. The method of claim 1, wherein creating the virtual test cell includes performing a Kriging interpolation step.

3. The method of claim 2, wherein the Kriging interpolation includes smooth Kriging.

4. The method of claim 1, further including performing a convergence check on each response surface based on a set of monitoring points.

5. The method of claim 4, wherein the response surfaces are not based on the monitoring points.

6. The method of claim 1, wherein the step of interrogating includes interrogating a set of test points not included in the providing step.

7. The method of claim 1, wherein the determining step includes determining a boundary of the historical test data, determining a test plan, and determining the inputs from the intersection of the boundary and the test plan.

8. The method of claim 1, wherein the interrogating step includes utilizing an optimization procedure including objective functions and constraints.

9. The method of claim 1, wherein the sequential space-filling sampling includes selecting points based on minimizing a penalty measure.

10. The method of claim 1, wherein determining the set of inputs includes determining a set of inputs associated with an automotive powertrain.

11. A calibration system comprising:
    a physical test cell;
    a test system communicatively coupled to the physical test cell, the test system configured to: determining a set of inputs to be provided to the physical test cell based in part on a set of historical test data; provide the inputs to the physical test cell and receiving a set of outputs associated therewith, wherein the providing includes implementing a sequential space filling sampling procedure to substantially cover a region defined by the set of historical values; create a virtual test cell comprising one or more response surfaces based on the set of outputs; and interrogate the virtual test cell to determine a calibration relationship between at least one of the inputs and at least one of the outputs by providing a set of test points to the virtual test cell and receiving a set of virtual test cell outputs corresponding to the set of test points on the one or more response surfaces.

12. The system of claim 11, wherein the test system is configured to perform Kriging interpolation.

13. The system of claim 11, wherein the test system performs a convergence check on each response surface based on a set of monitoring points, and wherein the response surfaces are not based on the monitoring points.

14. The system of claim 11, wherein the test system is configured to determine the inputs from the intersection of a test plan and a boundary associated with the historical test data.

15. The system of claim 11, wherein the test system utilizes an optimization procedure including objective functions and constraints.

16. The system of claim 11, wherein the test system performs sequential space-filling sampling by selecting points based on minimizing a penalty measure.

17. The system of claim 11, wherein the physical test cell is an automotive powertrain.

18. A method for calibrating an automotive component, the method comprising:
    determining a set of inputs to be provided to the automotive component based in part on a set of historical test data;
    providing the inputs to the automotive component and receiving a set of outputs associated therewith, wherein the providing includes implementing a sequential space filling sampling procedure to substantially cover a region defined by the set of historical values;

creating a virtual test cell comprising one or more response surfaces based on the set of outputs and Kriging interpolation, wherein creating the virtual test cell includes storing instructions within a computer-readable medium, the instructions being configured to cause a processor to produce a virtual test cell output based on a virtual test cell input and the one or more response surfaces;

checking for convergence of the response surfaces based on a set of monitoring points that are not themselves used to calculate the response surfaces;

interrogating the virtual test cell to determine a calibration relationship between at least one of the inputs and at least one of the outputs, wherein the interrogating includes providing a set of test points to the virtual test cell and receiving a set of virtual test cell outputs corresponding to the set of test points on the one or more response surfaces.

19. The method of claim 18, wherein the determining step includes determining a boundary of the historical test data, determining a test plan, and determining the inputs from the intersection of the boundary and the test plan.

20. The method of claim 18, wherein the interrogating step includes utilizing an optimization procedure including objective functions and constraints.

* * * * *